(12) United States Patent
Ikeda

(10) Patent No.: US 8,365,707 B2
(45) Date of Patent: Feb. 5, 2013

(54) PLASMA APPARATUS USING A CYLINDER HEAD

(75) Inventor: Yuji Ikeda, Kobe (JP)

(73) Assignee: Imagineering, Inc., Kobe-shi, Hyogo (JP)

( * ) Notice: Subject to any disclaimer, the term of this patent is extended or adjusted under 35 U.S.C. 154(b) by 365 days.

(21) Appl. No.: 12/881,882

(22) Filed: Sep. 14, 2010

(65) Prior Publication Data

US 2011/0025210 A1 Feb. 3, 2011

Related U.S. Application Data

(63) Continuation-in-part of application No. PCT/JP2009/054966, filed on Mar. 13, 2009.

(30) Foreign Application Priority Data

Mar. 14, 2008 (JP) ................................. 2008-066890

(51) Int. Cl.
*F02P 23/04* (2006.01)
(52) U.S. Cl. ...................................................... 123/536
(58) Field of Classification Search .......... 123/536–539, 123/143 R, 143 B, 169 EL
See application file for complete search history.

(56) References Cited

U.S. PATENT DOCUMENTS 4,774,914 A * 10/1988 Ward .............................. 123/162
4,841,925 A * 6/1989 Ward ........................ 123/143 B

FOREIGN PATENT DOCUMENTS

| JP | 6-229334 A | 8/1994 |
| JP | 7-008567 U | 2/1995 |
| JP | 2000-179412 A | 6/2000 |
| JP | 2002-295259 A | 10/2002 |
| JP | 2002-295264 A | 10/2002 |
| JP | 2007-113570 A | 5/2007 |

OTHER PUBLICATIONS

International Search Report of PCT/JP2009/054966, mailing date Apr. 14, 2009.

* cited by examiner

*Primary Examiner* — M. McMahon
(74) *Attorney, Agent, or Firm* — Westerman, Hattori, Daniels & Adrian, LLP

(57) ABSTRACT

Provided is a plasma apparatus using a cylinder head, which comprises a discharge device installed with an electrode exposed to the combustion chamber and installed in the cylinder head, an antenna installed to protrude from the cylinder head into the combustion chamber, a bulging portion bulging from the cylinder head to the combustion chamber so as to cover the antenna, made from insulator or dielectric, an electromagnetic wave transmission line installed in the cylinder head and with one end connected to the antenna and the other end, covered with insulator or dielectric, penetrating the cylinder head to extend to an outer wall of the cylinder head, and an electromagnetic wave generator for feeding electromagnetic waves to the electromagnetic wave transmission line. At compression stroke, discharge is generated with the electrode of the discharge device and the electromagnetic waves, fed from the electromagnetic wave generator through the electromagnetic wave transmission line, are radiated from the antenna.

14 Claims, 3 Drawing Sheets

PLASMA APPARATUS USING A CYLINDER HEAD

TECHNICAL FIELD

This invention belongs to the technical field of the internal combustion engine, and relates to the improvement of combustion in the combustion chamber of an internal combustion engine with a cylinder head.

BACKGROUND OF THE INVENTION

Patent Document 1 shows an internal combustion engine including a combustion/reaction chamber, auto-ignition means, microwave radiation means, and control means. The combustion/reaction chamber consists of a cylinder and piston. The combustion/reaction chamber is supplied with a mixture of reactive and oxidation gas. In the combustion/reaction chamber, a plasma reaction of the mixture is carried out. The auto-ignition means automatically ignites the mixture by injecting a mixture of reactive and oxidation gas under high pressure, compressing the mixture and increasing the temperature. The microwave radiation means radiates the combustion/reaction chamber with microwaves. The control means controls the auto-ignition means and microwave radiation means, and repeats a cycle that involves radiating the combustion/reaction chamber with microwaves so that large amounts of hydroxyl (OH) radicals and ozone ($O_3$) are generated from the moisture in the combustion/reaction chamber mixture, which then oxidizes and reacts chemically, combustion of the mixture in the combustion/reaction chamber is promoted by the large amount of OH radicals and $O_3$, when the auto-ignition, means ignites the mixture.

The internal-combustion engine with an electrical field formed in the combustion chamber is disclosed in Patent Documents 2 to 4. Patent Document 2 outlines an internal combustion engine, containing the following: a cylinder block with a cylinder wall; a cylinder head on the cylinder block; a piston in the cylinder block; a combustion chamber formed by the cylinder wall, cylinder head and piston; and an electrical field apply means for applying an electrical field in the combustion chamber during combustion of the engine. When an electrical field is applied to the flame in this internal combustion engine, ions move into the flame and collide. This increases the flame propagation speed, and the ions in the gas that has already burnt move to unburned gas and alter the chemical reaction in the unburned gas. This maintains a uniform flame temperature and controls engine knock.

[Patent Document 1] Japanese Patent Application Laid-open Publication No. 2007-113570
[Patent Document 2] Japanese Patent Application Laid-open Publication No. 2000-179412
[Patent Document 3] Japanese Patent Application Laid-open Publication No. 2002-295259
[Patent Document 4] Japanese Patent Application Laid-open Publication No. 2002-295264

SUMMARY OF THE INVENTION

The inventor of the present invention extrapolated the mechanism of combustion promotion in the internal combustion engine which is disclosed in Patent Document 1, and obtained a constant finding about the mechanism. In this mechanism, a small amount of plasma is discharged firstly. The plasma is irradiated with microwaves for a given period of time, so that the amount of plasma increases. Thus a large amount of OH radicals and ozone is generated from moisture in the air-fuel mixture within a short period of time, promoting an air-fuel mixture reaction. This mechanism of the combustion promotion, obtained by generating a large amount of OH radicals and ozone, promotes combustion with plasma, is entirely different from combustion-promoting mechanisms that use ions to increase flame propagation speed, disclosed in Patent Documents 2 through 4.

In the art of Patent Documents 2, said electrical field apply means comprises a conductive member arranged so as to apply the electrical field in the combustion chamber. This conductive member is a nickel-chromium alloy wire, with a preferable diameter of 1.0 mm, and installed in an annular groove established in an annular insulator inserted in the cylinder wall of the cylinder block. In the art of Patent Documents 2 through 4, the substantial modifications required for the cylinder block and other structural components of a conventional internal combustion engine. These modifications increase the time required to design an engine, and do not permit the sharing of parts with existing internal combustion engines.

In the view of the foregoing, the present invention has been achieved. An object of the invention is to provide the plasma apparatus using a cylinder head, which can easily realize the combustion-promoting mechanism, obtained by generating a large amount of OH radicals and ozone with plasma, by using the existing internal combustion engine as far as possible. By this realization, it can be realized to minimize the time required to design an engine and facilitate the sharing of many parts between existing internal combustion engines.

The present invention is plasma apparatus using a valve, which installed in an internal combustion engine of which combustion chamber formed by a cylinder block that is penetrated by a cylinder, a piston fits into the cylinder so as to reciprocate freely, and the cylinder head assembled to the anti-crankcase side of the cylinder block, the plasma apparatus comprises, a discharge device with an electrode exposed to the combustion chamber and installed in the cylinder head, an antenna installed to protrude from the cylinder head into the combustion chamber, a bulging portion bulging from the cylinder head to the combustion chamber so as to cover the antenna, made from insulator or dielectric, an electromagnetic wave transmission line installed in the cylinder head and with one end connected to the antenna and the other end, covered with insulator or dielectric, penetrating the cylinder head to extend to an outer wall of the cylinder head, and an electromagnetic wave generator for feeding electromagnetic waves to the electromagnetic wave transmission line, wherein the plasma apparatus is configured such that discharge is generated with the electrode of the discharge device and the electromagnetic waves fed from the electromagnetic wave generator through the electromagnetic wave transmission line are radiated from antenna at compression stroke.

At the compression stroke in the actuation of the internal combustion engine, discharge is generated at the electrode of the discharge device and the electromagnetic waves fed from the electromagnetic wave generator through the electromagnetic wave transmission line are radiated from the antenna. Therefore, the plasma is generated near the electrode. This plasma receives energy of an electromagnetic waves (electromagnetic wave pulse) supplied from the antenna for a given period of time. As a result, the plasma generates a large amount of OH radicals and ozone to promote the combustion. In fact electrons near the electrode are accelerated, fly out of the plasma area, and collide with gas such as air or the air-fuel mixture in surrounding area of said plasma. The gas in the surrounding area is ionized by these collisions and becomes plasma. Electrons also exist in the newly formed plasma.

These also are accelerated by the electromagnetic wave pulse and collide with surrounding gas. The gas ionizes like an avalanche and floating electrons are produced in the surrounding area by chains of these electron acceleration and collision with electron and gas inside plasma. These phenomena spread to the area around discharge plasma in sequence, then the surrounding area get into plasma state. In the result of the phenomena as mentioned above it, the volume of plasma increases. Then the electrons recombine rather than dissociate at the time when the electromagnetic wave pulse radiation is stopped. As a result, the electron density decreases, and the volume of plasma decreases as well. The plasma disappears when the electron recombination is completed. A large amount of OH radicals and ozone is generated from moisture in the gas mixture as a result of a large amount of the generated plasma, promoting the combustion of the mixture.

In this case, the cylinder block etc. which are the major structural materials can be used without modification compared with existing internal combustion engine. And the cylinder head is remodeled. With the exception of internal combustion engine which basically needs spark plug, it may mount a discharge device on the cylinder head in internal combustion engine that is not necessary a spark plug. Therefore, it is realized to minimize the time required to design an internal combustion engine and share many parts with existing internal combustion engines. In addition, the bulging portion reduces the heat load which affects the antenna in the combustion chamber and the fatigue of the antenna due to mechanical vibration.

The plasma apparatus of the present invention may be applicable for which the antenna edge aims at the electrode of the discharge device.

This allows the plasma generated by the discharge at the electrode to radiate electromagnetic wave pulses from the antenna intensively. As a result, the plasma is supplied energy intensively, which generates a large amount of OH radicals and ozone efficiently, further promoting the combustion.

The plasma apparatus of the present invention may be applicable for which the electrode is placed in the vicinity of the center of the combustion chamber, and the antenna is installed between the electrode and a portion corresponding to a cylinder wall on the cylinder head, when viewed from the direction of reciprocation of the piston.

This allows the plasma generated by the discharge near the electrode to receive energy from the electromagnetic wave pulse radiated from the antenna, increasing its volume. The antenna is placed between the electrode and the portion corresponding to the cylinder wall. Hence, a large amount of plasma is distributed from the electrode to the portion corresponding to the cylinder wall, and the combustion flame is spread from the electrode to the cylinder wall by the OH radicals and ozone generated by the plasma.

The plasma apparatus of the present invention may be applicable for which the electrode is placed in the vicinity of the center of the combustion chamber, and a plurality of antennas queue up from the electrode toward a portion corresponding to a cylinder wall on the cylinder head, when viewed from the direction of reciprocation of the piston.

This allows the plasma generated by the discharge near the electrode to receive energy from the electromagnetic wave pulse radiated from the antennas, increasing its volume. The antennas queue up from the electrode to the portion corresponding to the cylinder wall. Hence, a large amount of plasma is distributed from the electrode to the portion corresponding to the cylinder wall, and the combustion flame is spread from the electrode to the cylinder wall by the OH radicals and ozone generated by the plasma.

The plasma apparatus of the present invention may be applicable for which the electrode and the antenna are arranged so that a virtual line, which connect the electrode and the antenna, pass through two adjoining ports of one or more inlet ports and one or more exhaust ports in the cylinder head, the intake port is opened and closed by an intake valve and the exhaust port is opened and closed by an outlet valve.

This makes possible that the antenna is allocated effectively by using plane between ports.

The plasma apparatus of the present invention may be applicable for which the electrode is located close to a portion where the electric field intensity generated by the electromagnetic waves becomes strong in the antenna when the electromagnetic waves are fed to the antenna.

This makes it possible that the electromagnetic wave pulse irradiates the plasma generated by the discharge at the electrode from the antenna near plasma. The energy is intensively supplied to said plasma. As a result, a large amount of OH radicals and ozone is efficiently generated, further promoting the combustion.

DESCRIPTION OF REFERENCE CHARACTERS

Figure 1:
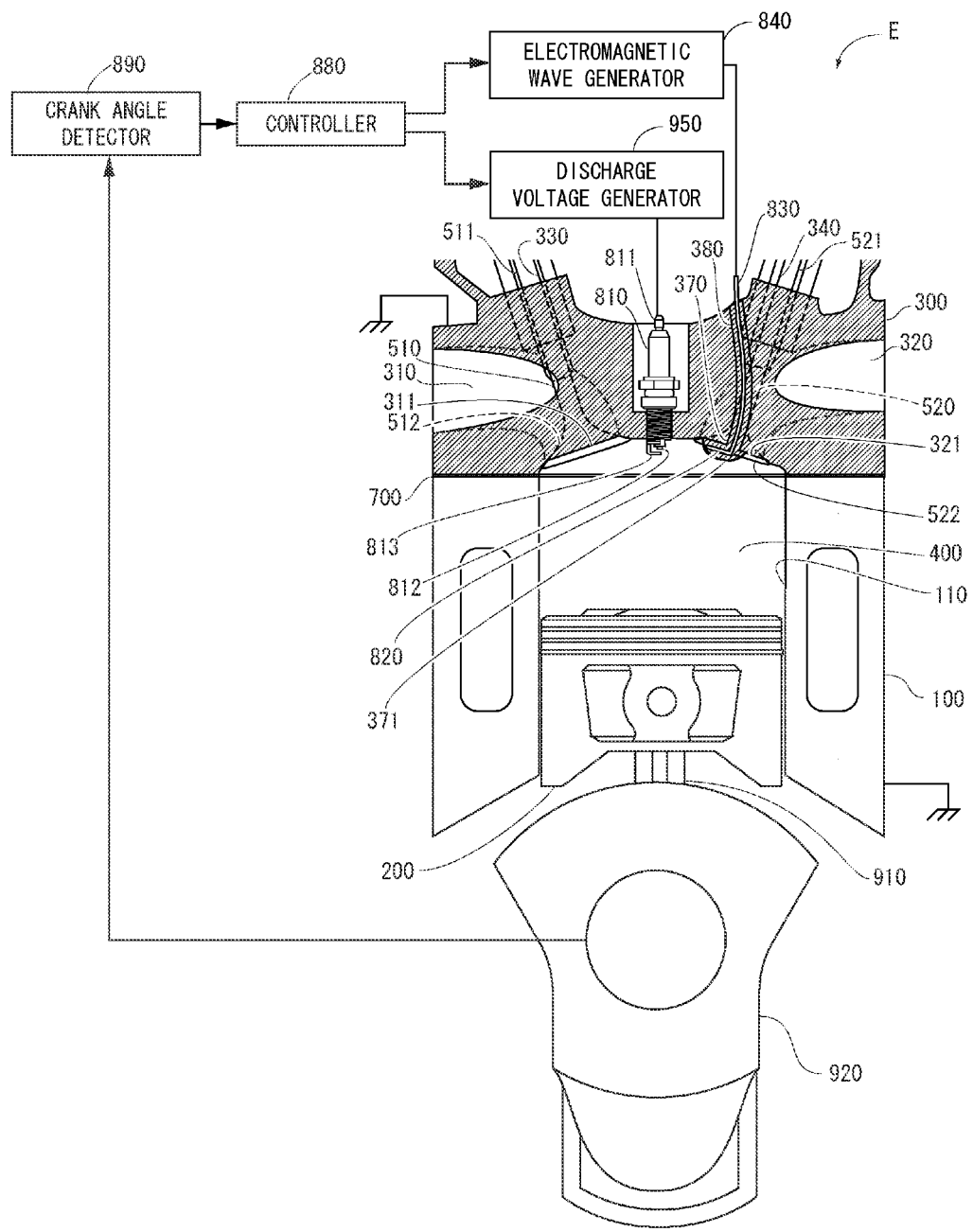
FIG. 1 shows a vertical cross-section view of the combustion chamber in an internal combustion engine with the plasma apparatus using a cylinder head in the first embodiment of the present invention.

E Internal combustion engine
100 Cylinder block
110 Cylinder
200 Piston
300 Cylinder head
371 Bulging portion
400 Combustion chamber
810 Discharge device
812 First electrode
813 Second electrode
820 Antenna
830 Electromagnetic wave transmission line
840 Electromagnetic wave generator

DETAILED DESCRIPTION OF THE INVENTION

Figure 2:
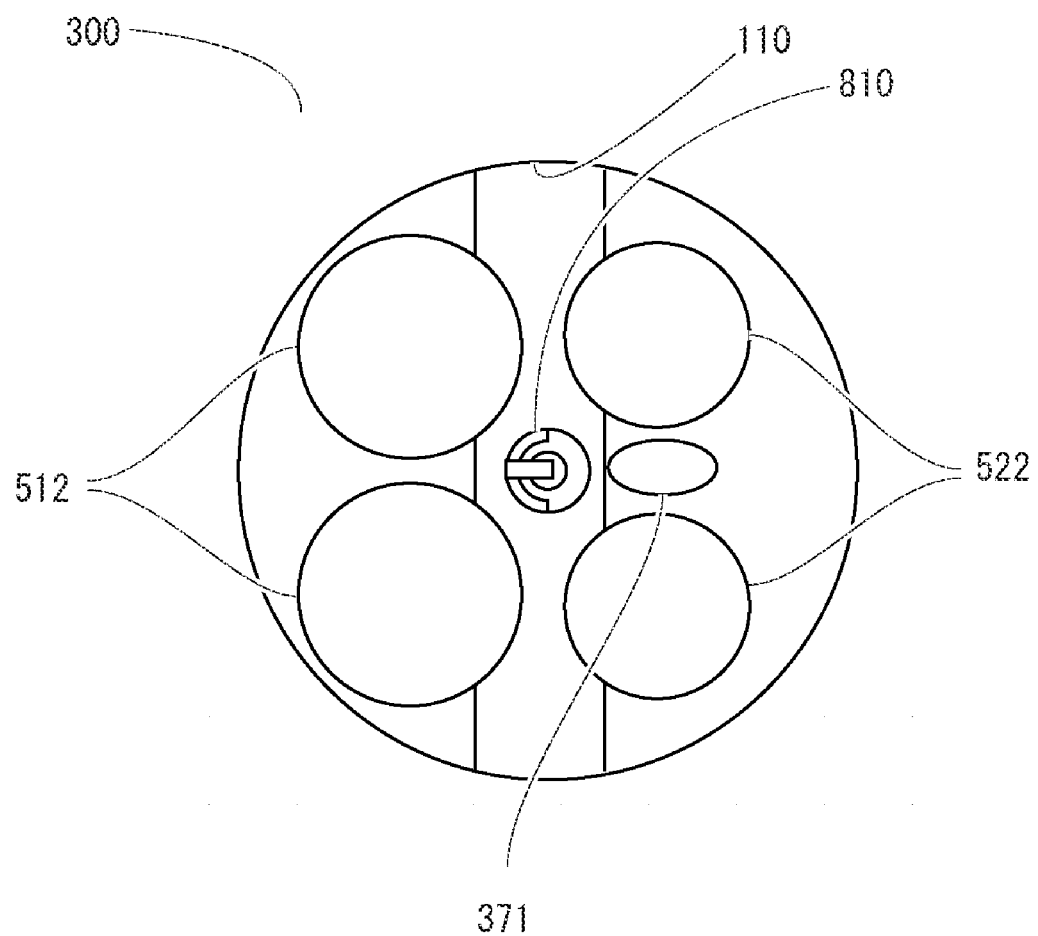
FIG. 2 shows an enlarged cross-section view of the cylinder block, along a surface seen from the direction of reciprocation of piston, in an internal combustion engine with the plasma apparatus using a cylinder head in the first embodiment of the present invention.

Hereinafter, embodiments of the present invention will be described. FIGS. 1 and 2 shows the embodiment of the internal combustion engine E comprising the plasma apparatus using a cylinder head of the present invention. The present invention targets reciprocating engines. In this embodiment, engine E is a four-cycle gasoline engine. Item 100 is the cylinder block. Cylinder block 100 contains cylinder 110, which has an approximately circular cross section. Cylinder 110 penetrates cylinder block 100. Piston 200, which has an approximately circular cross section corresponding to cylinder 110, fits into cylinder 110 and reciprocates freely. Cylinder head 300 is assembled on the anti-crankcase side of cylinder block 110. Cylinder head 300, piston 200, and cylinder 110 form combustion chamber 400. Item 910 is a connecting rod, with one end connected to piston 200 and the other end connected to crankshaft 920, which is the output shaft. Cylinder head 300 has intake port 310, which is a component of the intake line, and exhaust port 320, which is a component of the exhaust line. One end of intake port 310 connects to combustion chamber 400; the other end is open at the outside wall of cylinder head 300. One end of exhaust port 320 connects to combustion chamber 400; the other end is open at the outside wall of cylinder head 300. The cylinder head has guide hole 330 that passes through intake port 310 to the outside wall of cylinder head 300. Rod-shaped valve stem 511 of intake valve 510 fits into guiding hole 330 and reciprocates freely. Umbrella-shaped valve head 512, set at the end of valve stem 511, opens and closes the combustion chamber side opening 311 of intake port 310 at a given timing by a valve open/close mechanism having a cam and so on(not shown in the figure). Cylinder head 300 has guiding hole 340 that passes through exhaust port 320 to the outside wall of cylinder head 300. Rod-shaped valve stem 521 of exhaust valve 520 fits into guiding hole 340 and reciprocates freely. Umbrella-shaped valve head 522, set at the end of valve stem 521, opens and closes the combustion chamber side opening 321 of the exhaust port 320 at a given time by the valve open/close mechanism having cam and so on (not shown in the figure). Item 810 is a spark plug installed in cylinder head 300 to expose a pair of electrodes 812, 813 to combustion chamber 400. Spark plug 810 discharges at the electrodes when piston 200 is near top dead center. Therefore, four strokes (intake, compression, combustion of mixture, and exhaust of exhaust gas) occur while piston 200 reciprocates between top dead center and bottom dead center twice. However, this embodiment does not restrict the interpretation of the internal combustion engine targeted by the present invention. The present invention is also suitable for use with two-stroke internal combustion engines and diesel engines. Target gasoline engines include direct-injection gasoline engines, which create a mixture inside the combustion chamber to inject fuel into the intake air. Target diesel engines include direct-injection diesel engines, which inject fuel into the combustion chamber directly, and divided-chamber diesel engines, which inject fuel into divided chamber. Internal combustion engine E in this embodiment has four cylinders, but this does not restrict number of cylinders of the internal combustion engine targeted by the present invention. The internal combustion engine for this embodiment has two intake valves 510 and two exhaust valves 520, but this does not restrict the number of intake or exhaust valves of the internal combustion engine targeted by the present invention. Item 700 is a gasket installed between cylinder block 100 and cylinder head 300.

Said spark plug 810 also functions as a discharge device 810 of the plasma apparatus using a cylinder head of the present invention. This discharge device 810 is installed in the cylinder head 300. This discharge device 810 is set on the wall of the combustion chamber 400. This discharge device 810 comprises a connection 811 set outside of the combustion chamber 400, a first electrode 812 electrically-connected to the connection 811, and a second electrode 813 contacts the cylinder head 300 and connects in ground. The first electrode 812 and the second electrode 813 are placed opposite at specified interval on the discharge device 810. Both of them are exposed to the combustion chamber 400. The discharge device 810 is connected to a discharge voltage generator 950 which generates voltage for discharge. Here, the discharge voltage generator 950 is DC 12V power supply and a spark coil. The cylinder head 300 is earthed and the connection 811 connects to the discharge voltage generator 950. In case of applying voltage between the cylinder head 300 and the connection 811, discharge happens between the first electrode 812 and the second electrode 813. As described above, it may discharge between the electrodes of the discharge device and a wall of the combustion chamber, or other earthed members without a pair of electrodes. For example, in case that the internal combustion engine is a diesel engine, it does not install a spark plug under normal circumstances. Therefore it needs to install the discharge device, having an electrode exposed to the combustion chamber, on the cylinder head. In this case, it may install the spark plug as explained above as the discharge device, and connects it to the discharge voltage generator. However the discharge device does not always need to use a spark plug, because the discharge device requires generating plasma by discharge regardless the size. The discharge device may be used for example piezo element or other device.

Antenna 820 is installed in cylinder head 300 to radiate electromagnetic waves to combustion chamber 400. The wall of combustion chamber 400 in cylinder head 300 contains a hole that penetrates to the outside wall. Inside support 370 is installed near the combustion chamber side opening of this hole, and tubular outside support 380 is installed outside and continuation of the inside support 370. Inside support 370 and outside support 380 are made from a ceramic. Both supports may be made from dielectric material or an insulator. Antenna 820, which is made from metal, is installed in inside support 370. However, it can be made from a conductor, dielectric or insulator, provided that electromagnetic waves are radiated well from it to the combustion chamber when they are supplied between the antenna and the earth member. Antenna 820 consists of a bar installed near the combustion chamber side opening of said hole. Antenna 820 protrudes from cylinder head 300 to combustion chamber 400. Inside support 370 contains a bulging portion 371. This bulging portion 371 bulges from the wall of combustion chamber 400 in cylinder head 300, covering antenna 820. Bulging portion 371 may be made from an insulator or dielectric. Because the bulging portion 371 forms part of inside support 370, it is also made from a ceramic. The bulging portion may be made from different materials against inside support. For example, the length of the antenna 820 is set to a quarter of wavelength in electromagnetic waves, standing wave is generated in the antenna 820. Thus, electrical field strength at the end of antenna 820 becomes strong. For example, the length of the antenna 820 is set to a multiple of a quarter wavelengths of the electromagnetic waves so that standing waves are generated in the antenna 820, increasing the electrical field at multiple points, where the anti-nodes of the standing waves are generated, in the antenna 820. Here, antenna 820 is buried inside support 370. The solid cross-section of antenna 820 is approximately circular for its entire length. However, antenna 820 of the plasma apparatus of the present invention is not restricted to a circular cross-sectional shape. The first electrode 812 and the second electrode 813 are located close to a portion where the electric field intensity generated by the electromagnetic waves becomes strong in the antenna 820 when the electromagnetic waves are fed to the antenna 820. Here, the end of antenna 820, the first electrode 812 and the second electrode 813 are close to each other along the wall of combustion chamber 400 in cylinder head 300 at specified intervals. Thus, when electromagnetic waves are supplied between antenna 820 and cylinder head 300, which is earthed, electromagnetic waves are radiated from antenna 820 to combustion chamber 400. In this embodiment, antenna 820 is a rod-shaped curved monopole. However, the antenna of the plasma apparatus in the present invention is not restricted. The antenna of the plasma apparatus in the present invention may be dipole type, Yagi-Uda type, single wire type, loop type, phase difference feeder type, grounded type, ungrounded and perpendicular type, beam type, horizontal polarized omni-directional type, corner-reflector type, comb type or other type of linear antenna, microstrip type, planar inverted F type or other type of flat antenna, slot type, parabola type, horn type, horn reflector type, Cassegrain type or other type of solid antenna, Beverage type or other type of traveling-wave antenna, star EH type, bridge EH type or other type of EH antennas, bar type, small loop type or other type of magnetic antenna, or dielectric antenna.

Electromagnetic wave transmission line 830 is installed in cylinder head 300. One end of electromagnetic wave transmission line 830 is connected to antenna 820, and the other end is covered by a dielectric that penetrates and stretches to the outside wall of cylinder head 300. Electromagnetic wave transmission line 830 is installed in outside support 380, and is made from copper wire. Electromagnetic wave transmission line 830 may also be made from any conductor, insulator, or dielectric, as long as electromagnetic waves are transmitted well to antenna 820 when they are supplied between antenna 820 and the earthed member. A possible variation is an electromagnetic wave transmission line that consists of a waveguide made from a conductor or dielectric. Here, electromagnetic wave transmission line 830 is buried in outside support 380, and passed through outside support 380. One end of the electromagnetic wave transmission line 830 is connected to said antenna 820 and the other end is extracted from the outside wall of cylinder head 300 to outside. Thus, when electromagnetic waves are supplied between electromagnetic wave transmission line 830 and cylinder head 300 that is the earth member, they are introduced into antenna 820.

Electromagnetic wave generator 840 supplies the electromagnetic waves to transmission line 830, and is installed in internal combustion engine E or its surroundings. Electromagnetic wave generator 840 in this embodiment is a magnetron that generates 2.4-GHz-bandwidth microwaves. However, this does not restrict the construction of the electromagnetic wave generator of the plasma apparatus in the present invention.

As shown in FIG. 1, antenna 820 stretches from the outside wall of cylinder head 300 to combustion chamber 400 along the pass of hole. Then the antenna 820 turns off L-shaped. The end of antenna 820 aims at the first electrode 812 and the second electrode 813 of discharge device 810 along the wall of combustion chamber 400 in cylinder head 300. In addition, as shown in FIG. 2, the first electrode 812 and the second electrode 813 are placed in the vicinity of the center of the combustion chamber 400, when viewed from the direction of reciprocation of the piston. Antenna 820 is installed from the first electrode 812 and the second electrode 813 to a portion corresponding to a cylinder wall on the cylinder head. Two exhaust valves 520 are installed in this embodiment, although multiple exhaust values 520 may be used. The first electrode 812, the second electrode 813, and antenna 820 are arranged so that a virtual line, which connects the first electrode 812 or the second electrode 813 and the antenna 820, pass through two adjoining ports of two inlet ports 310 and two exhaust ports 320 in the cylinder head 300.

In this plasma apparatus, discharge is generated between the first electrode 812 and the second electrode 813, and electromagnetic waves fed from the electromagnetic wave generator 840 through the electromagnetic wave transmission line 830 are radiated from the antenna 820 at the compression stroke. Cylinder head 300 is earthed. The earth terminals of discharge voltage generator 950 and electromagnetic wave generator 840 are earthed. Discharge voltage generator 950 and electromagnetic wave generator 840 are controlled by controller 880, which has a CPU, memory, and storage etc, and outputs control signals after computing input signals. A signal line from crank angle detector 890 for detecting crank angle of crankshaft 920 is connected to control unit 880. Crank angle detection signals are sent from crank angle detector 890 to controller 880. Therefore, controller 880 receives signals from crank angle detector 890 and controls the actuations of discharge device 810 and electromagnetic wave generator 840. However, this does not restrict the control method and the composition of the input-output signals as for plasma apparatus of the present invention.

Therefore, at the compression stroke in the actuation of the internal combustion engine E, discharge is generated between the first electrode 812 and the second electrode 813 of said discharge device 810 and the electromagnetic waves fed from the electromagnetic wave generator 840 through the electromagnetic wave transmission line 830 are radiated from the antenna 820. Therefore, plasma is generated near the first electrode 812 and the second electrode 813 by discharge. This plasma receives energy of an electromagnetic waves (electromagnetic wave pulse) supplied from the antenna 820 for a given period of time. As a result, the plasma generates a large amount of OH radicals and ozone to promote the combustion. In fact electrons near the electrode are accelerated, fly out of the plasma area, and collide with gas such as air or the air-fuel mixture in surrounding area of said plasma. The gas in the surrounding area is ionized by these collisions and becomes plasma. Electrons also exist in the newly formed plasma. These also are accelerated by the electromagnetic wave pulse and collide with surrounding gas. The gas ionizes like an avalanche and floating electrons are produced in the surrounding area by chains of these electron acceleration and collision with electron and gas inside plasma. These phenomena spread to the area around discharge plasma in sequence, then the surrounding area get into plasma state. In the result of the phenomena as mentioned above it, the volume of plasma increases. Then the electrons recombine rather than dissociate at the time when the electromagnetic wave pulse radiation is stopped. As a result, the electron density decreases, and the volume of plasma decreases as well. The plasma disappears when the electron recombination is completed. A large amount of OH radicals and ozone is generated from moisture in the gas mixture as a result of a large amount of the generated plasma, promoting the combustion of the mixture.

In this case, the cylinder block etc. which are the major structural materials can be used without modification compared with existing internal combustion engine. And the cylinder head is remodeled. With the exception of internal combustion engine E which basically needs spark plug 810, it may mount a discharge device on the cylinder head in internal combustion engine that is not necessary a spark plug. Therefore, it is realized to minimize the time required to design an internal combustion engine and share many parts with existing internal combustion engines. In addition, the bulging portion reduces the heat load which affects the antenna in the combustion chamber and the fatigue of the antenna due to mechanical vibration.

In the plasma apparatus using a cylinder head of the present invention, the antenna may be installed to protrude from the cylinder head into the combustion chamber. The direction of the antenna tip is not restricted. Though there are various embodiments, the tip direction of the antenna 820 aims at the first electrode 812 and the second electrode 813 of the discharge device 810 in the plasma apparatus using a cylinder head of the present invention. This allows the plasma generated by the discharge at the electrode to radiate electromagnetic wave pulses from the antenna 820 intensively. As a result, the plasma is supplied energy intensively, which generates a large amount of OH radicals and ozone efficiently, further promoting the combustion.

In the plasma apparatus using a cylinder head of the present invention, the electrodes of the discharge device, installed in the cylinder head, may be exposed to the combustion chamber. The position of the electrodes is not restricted. Moreover, the antenna may be installed to protrude from the cylinder head into the combustion chamber. The position of the antenna is not restricted. Though there are various embodiments, the first electrode 812 and the second electrode 813 are placed in the vicinity of the center of the combustion chamber 400 when viewed from the direction of reciprocation of the piston in the plasma apparatus using a cylinder head of the present invention. Said antenna 820 is installed between the first electrode 812 or the second electrode 813 and the portion corresponding to the cylinder wall. This allows the plasma generated by the discharge near the first electrode 812 and the second electrode 813 to receive energy from the electromagnetic wave pulse radiated from the antenna 820, increasing its volume. Antenna 820 is installed between the first electrode 812 or the second electrode 813 and the portion corresponding to the cylinder wall. Hence, a large amount of plasma is distributed from the first electrode 812 or the second electrode 813 to the portion corresponding to the cylinder wall, and the combustion flame is spread from the first electrode 812 or the second electrode 813 to the cylinder wall by the OH radicals and ozone generated by the plasma.

In the plasma apparatus using a cylinder head of the present invention, relative position of the electrodes and the antenna is not restricted. Though there are various embodiments, the first electrode 812, the second electrode 813, and antenna 820 are arranged so that a virtual line, which connects the first electrode 812 or the second electrode 813 and the antenna 820, pass through two adjoining ports of two inlet ports 310 and two exhaust ports 320 in the cylinder head 300. This makes possible that the antenna 820 is allocated effectively by using plane between exhaust ports 320.

In the plasma apparatus using a cylinder head of the present invention, the positional relationship between the antenna and the electrodes are not restricted. Though there are various embodiments, the first electrode 812 and the second electrode 813 are located close to a portion where the electric field intensity generated by the electromagnetic waves becomes strong in the antenna 820 when the electromagnetic waves are fed to the antenna 820 in the plasma apparatus using a cylinder head of the present invention. This makes it possible that the electromagnetic wave pulse irradiates the plasma, generated by the discharge at the first electrode 812 and the second electrode 813, from the antenna 820 near plasma. The energy is intensively supplied to said plasma. As a result, a large amount of OH radicals and ozone is efficiently generated, further promoting the combustion.

Figure 3:
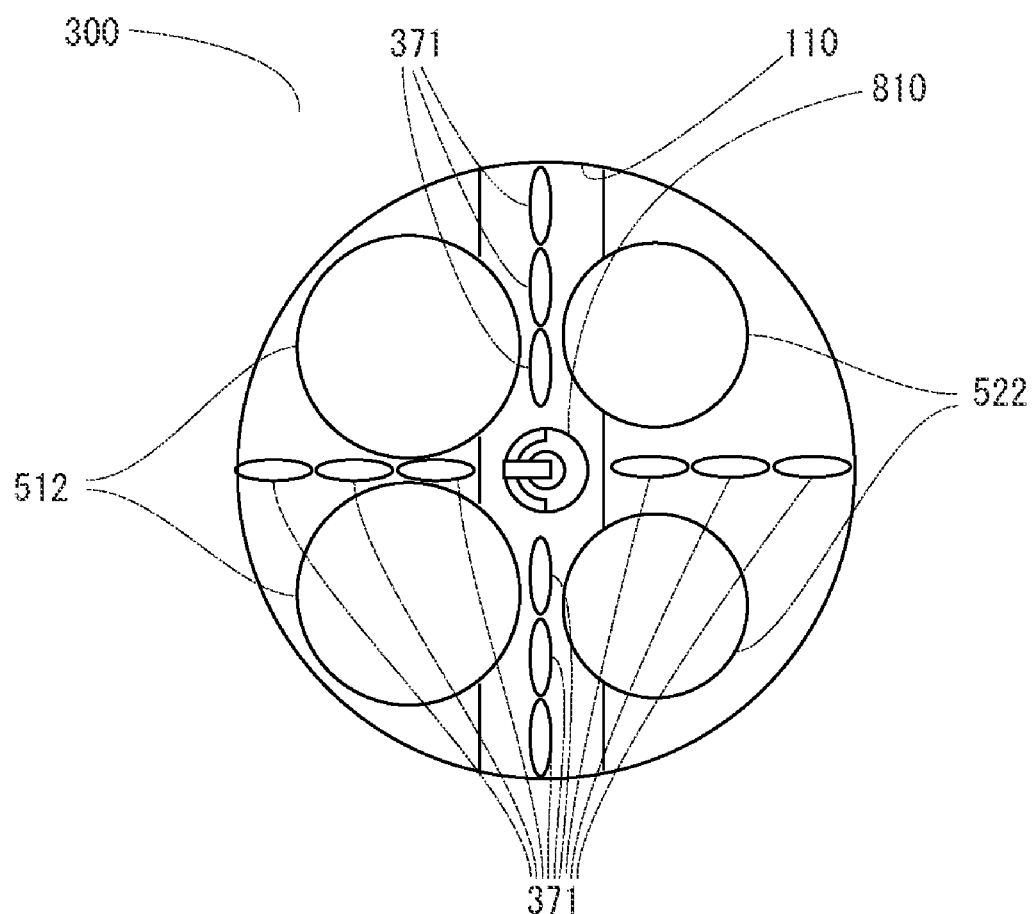
FIG. 3 shows an enlarged cross-section view of the cylinder block, along a surface seen from the direction of reciprocation of piston, in an internal combustion engine with the plasma apparatus using a cylinder head in the second embodiment of the present invention.

Next, the second embodiment about the plasma apparatus using a cylinder head will be described. The plasma apparatus in the second embodiment is different from the first embodiment in only number and alignment of the antenna 820. The plasma apparatus of the first embodiment installs one antenna 820. On the other hand, the plasma apparatus of the second embodiment, shown in FIG. 3 installs multiple antennas 820 which are same as the antenna 820 in the first embodiment. Said first electrode 812 and second electrode 813 are placed in the vicinity of the center of the combustion chamber 400 when viewed from the direction of reciprocation of the piston 200. Moreover said multiple antennas 820 queue up from said first electrode 812 or second electrode 813 toward the portion corresponding to the cylinder wall, when viewed from the direction of reciprocation of the piston 200. Here, three antennas 820 queue up respectively along four directions radiated from the center, when viewed from the direction of reciprocation of the piston 820. The angle between two directions next to each other is almost 90 degrees. Moreover, the first electrode 812, the second electrode 813, and antennas 820 are arranged so that a virtual line, which connects the first electrode 812 or the second electrode 813 and the antenna 820, pass through two adjoining ports of two inlet ports 310 and two exhaust ports 320 in the cylinder head 300.

In the second embodiment of the plasma apparatus of the present invention, said first electrode 812 and second electrode 813 are placed in the vicinity of the center of the combustion chamber 400, when viewed from the direction of reciprocation of the piston. Multiple antennas queue up from the first electrode 812 or the second electrode 813 toward the portion corresponding to a cylinder wall. This allows the plasma generated by the discharge near the first electrode 812 and the second electrode 813 to receive energy from the electromagnetic wave pulse radiated from the antennas 820, increasing its volume. The antennas 820 queue up from the first electrode 812 or the second electrode 813 to the portion corresponding to the cylinder wall. Hence, a large amount of plasma is distributed from the first electrode 812 or the second electrode 813 to the portion corresponding to the cylinder wall, and the combustion flame is spread from the electrodes to the cylinder wall by the OH radicals and ozone generated by the plasma.

In the second embodiment of the plasma apparatus of the present invention, the first electrode 812, the second electrode 813, and antennas 820 are arranged so that a virtual line, which connects the first electrode 812 or the second electrode 813 and the antenna 820, pass through two adjoining ports of two inlet ports 310 and two exhaust ports 320 in the cylinder head 300. This makes possible that the antennas are allocated effectively by using plane between ports. Other functions and effects are similar to the case of the plasma apparatus in the first embodiment.

In the plasma apparatus using a cylinder head of the present invention, a pair of the electrodes or a pair of the electrode and the earth member may as well be covered with a dielectric. In this case, the dielectric-barrier discharge is generated by voltage applied between the electrodes or between the electrode and the earth member. The dielectric-barrier discharge is restricted because charges are accumulated in the surface of the dielectric covering the electrode or the earth member. Therefore, the discharge is generated on a very small scale over a very short period of time. Thermalization does not occur in the area surrounding the discharge because the discharge is terminated after a short period of time. Therefore, the gas temperature rise due to the discharge between the electrodes is reduced, which reduces the amount of NOx produced by the internal combustion engine.

The present invention includes some embodiments that combine the characteristics of the embodiments described above. Moreover, the embodiments described above are only examples of the plasma apparatus using a cylinder head of the present invention. Thus, the description of these embodiments does not restrict interpretation of the plasma apparatus using a cylinder head of the present invention.

The invention claimed is:

1. A plasma apparatus using a cylinder head, which installed in an internal combustion engine of which combustion chamber formed by a cylinder block that is penetrated by a cylinder, a piston fits into the cylinder so as to reciprocate freely, and the cylinder head assembled to the anti-crankcase side of the cylinder block, the plasma apparatus comprising:
 a discharge device with an electrode exposed to the combustion chamber and installed in the cylinder head;
 an antenna installed to protrude from the cylinder head into the combustion chamber;
 a bulging portion bulging from the cylinder head to the combustion chamber so as to cover the antenna, made from insulator or dielectric;
 an electromagnetic wave transmission line installed in the cylinder head and with one end connected to the antenna and the other end, covered with insulator or dielectric, penetrating the cylinder head to extend to an outer wall of the cylinder head; and
 an electromagnetic wave generator for feeding electromagnetic waves to the electromagnetic wave transmission line;
 wherein the plasma apparatus is configured such that discharge is generated with the electrode of the discharge device and the electromagnetic waves fed from the electromagnetic wave generator through the electromagnetic wave transmission line are radiated from antenna at compression stroke.

2. The plasma apparatus according to claim 1, wherein the antenna edge aims at the electrode of the discharge device.

3. The plasma apparatus according to claim 1, wherein the electrode is placed in the vicinity of the center of the combustion chamber, and the antenna is installed between the electrode and a portion corresponding to a cylinder wall on the cylinder head, when viewed from the direction of reciprocation of the piston.

4. The plasma apparatus according to claim 1, wherein the electrode is placed in the vicinity of the center of the combustion chamber, and a plurality of antennas queue up from the electrode toward a portion corresponding to a cylinder wall on the cylinder head, when viewed from the direction of reciprocation of the piston.

5. The plasma apparatus according to claim 3, wherein the electrode and the antenna are arranged so that a virtual line, which connect the electrode and the antenna, pass through two adjoining ports of one or more inlet ports and one or more exhaust ports in the cylinder head, the intake port is opened and closed by an intake valve and the exhaust port is opened and closed by an outlet valve.

6. The plasma apparatus according to claim 1, wherein the electrode is located close to a portion where the electric field intensity generated by the electromagnetic waves becomes strong in the antenna when the electromagnetic waves are fed to the antenna.

7. The plasma apparatus according to claim 2, wherein the electrode is placed in the vicinity of the center of the combustion chamber, and the antenna is installed between the electrode and a portion corresponding to a cylinder wall on the cylinder head, when viewed from the direction of reciprocation of the piston.

8. The plasma apparatus according to claim 2, wherein the electrode is placed in the vicinity of the center of the combustion chamber, and a plurality of antennas queue up from the electrode toward a portion corresponding to a cylinder wall on the cylinder head, when viewed from the direction of reciprocation of the piston.

9. The plasma apparatus according to claim 3, wherein the electrode is placed in the vicinity of the center of the combustion chamber, and a plurality of antennas queue up from the electrode toward a portion corresponding to a cylinder wall on the cylinder head, when viewed from the direction of reciprocation of the piston.

10. The plasma apparatus according to claim 4, wherein the electrode and the antenna are arranged so that a virtual line, which connect the electrode and the antenna, pass through two adjoining ports of one or more inlet ports and one or more exhaust ports in the cylinder head, the intake port is opened and closed by an intake valve and the exhaust port is opened and closed by an outlet valve.

11. The plasma apparatus according to claim 2, wherein the electrode is located close to a portion where the electric field intensity generated by the electromagnetic waves becomes strong in the antenna when the electromagnetic waves are fed to the antenna.

12. The plasma apparatus according to claim 3, wherein the electrode is located close to a portion where the electric field intensity generated by the electromagnetic waves becomes strong in the antenna when the electromagnetic waves are fed to the antenna.

13. The plasma apparatus according to claim 4, wherein the electrode is located close to a portion where the electric field intensity generated by the electromagnetic waves becomes strong in the antenna when the electromagnetic waves are fed to the antenna.

14. The plasma apparatus according to claim 5, wherein the electrode is located close to a portion where the electric field intensity generated by the electromagnetic waves becomes strong in the antenna when the electromagnetic waves are fed to the antenna.

* * * * *